July 31, 1962    E. A. BAUER    3,046,790
PRESSURE RATIO COMPUTER
Filed Nov. 28, 1960
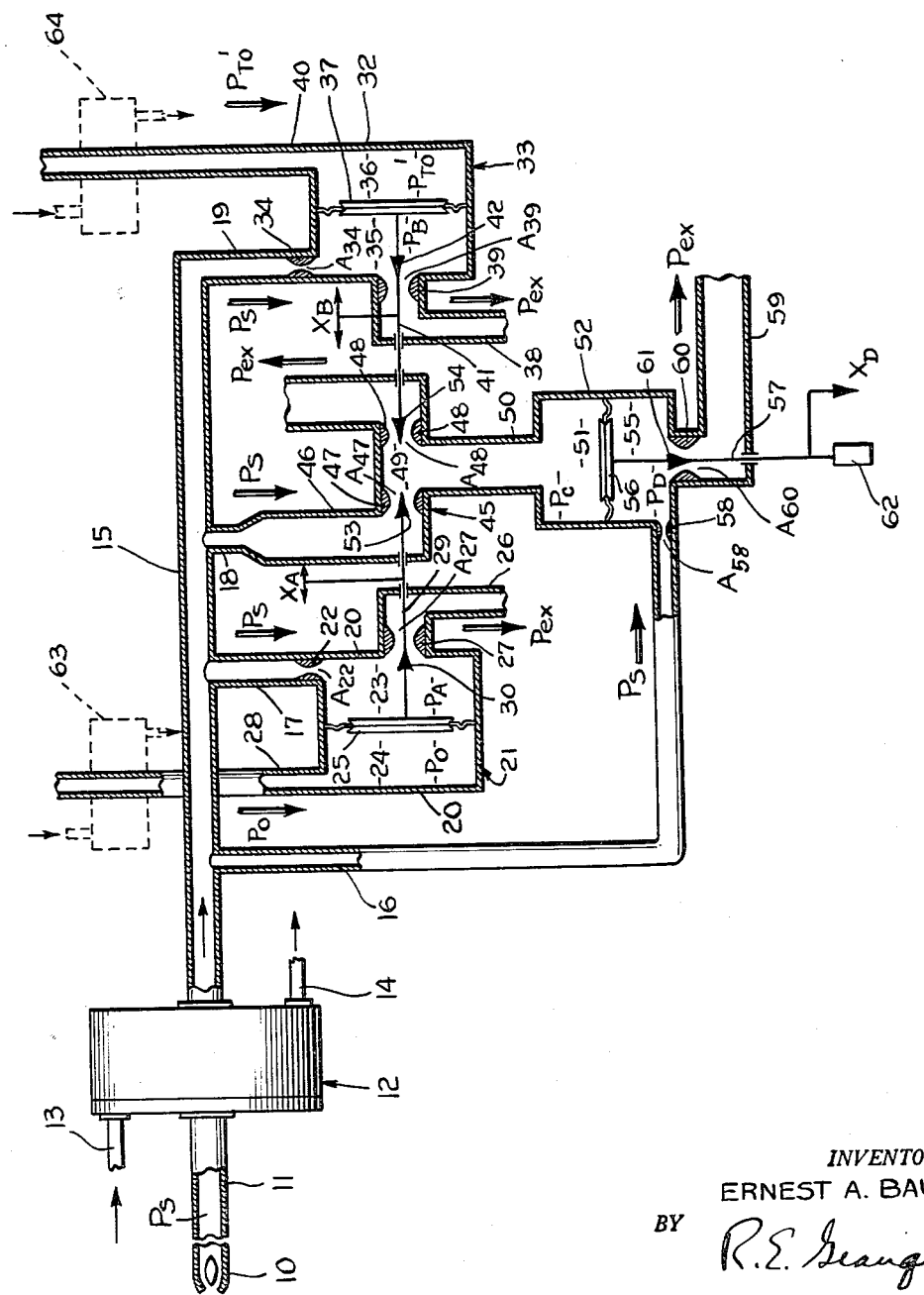
INVENTOR.
ERNEST A. BAUER
BY R.E. Geauque
ATTORNEYS

United States Patent Office 3,046,790
Patented July 31, 1962

3,046,790
PRESSURE RATIO COMPUTER
Ernest A. Bauer, Burbank, Calif., assignor to The Marquardt Corporation, Van Nuys, Calif., a corporation of California
Filed Nov. 28, 1960, Ser. No. 72,022
11 Claims. (Cl. 73—407)

This invention relates to a static pressure ratio computer and more particularly, to a ratio computer for high temperature applications in which the values of the pressures of the ratio are provided by static rather than by flowing fluid.

At the present time, it is common to utilize pressure ratios to obtain information concerning various conditions of jet engine operation, such as flight Mach number and thrust, and to measure various conditions such as specific fuel flow and exit nozzle efficiency. A measure of flight Mach number may be obtained from the ratio between static pressure and total pressure of the free stream air. Generally, present instruments utilized to compute this ratio depend upon air flow measurements for accuracy and all air flow methods for computation depend upon either mass continuity in an isothermal region or in temperature corrected pressure readings based on mass continuity in a non-isothermal region or they use bellows devices which are temperature limited in operation. With the extreme temperatures now encountered by high speed engines, flowing air used in the controls will differ in temperature from the air swallowed by the probes. Since the control measurements are performed in non-isothermal region, temperature compensations would be required if the mass continuity concept of measurement were utilized.

The present invention permits the computation of pressure ratios which are obtained from fluids which enter static probes at very high temperatures. In static lines, there is no flow during steady state so that pressures are the same throughout the lines, either with or without cooling. Cooling reduces the thermal activity of the molecules and increases the density of the fluid in a proportionate manner so that the pressures at the cool end and the hot end of the lines remain the same. Also, static lines may be cooled without penalties of accuracy since Pitot tubes convert flow pressure to static pressure and the lines connected with the Pitot tubes at the measuring stations can be cooled past the point whereby flow is brought to a stop, with no decrease in measuring accuracy.

The computer of the present invention, when used to measure Mach number, has Pitot tube means which obtains the static pressure and total pressure of the air stream. These pressures are both utilized in static pressure line so that the fluid at these pressures does not flow through the instrument. A source of work medium, such as cool air, is utilized in the portions of the instrument which employ flowing fluid in pressure dividers, such as disclosed in U.S. Patent Re. 24,410 issued December 31, 1957, to John A. Drake. The static pressure lines can, of course, be cooled since such cooling would not interfere with the measuring accuracy, but since no flow exists in these lines, very high temperatures can be withstood.

It is, therefore, an object of the present invention to provide a static pressure ratio computer which utilizes static, rather than flowing fluid as sources of reference pressure.

Another object of the present invention is to provide a high temperature, pressure ratio computer in which the reference pressures are obtained from static, rather than flowing, high temperature fluid and in which the portions of the instrument utilizing flowing fluid are supplied from a cooled source of working fluid, such as cooled air or other suitable gases, when a low temperature source is not available.

Another object of the present invention is to provide a high temperature, ratio computer in which Pitot tubes are utilized to obtain static pressures representing static and total pressure in the air stream so that the computer measures flight Mach number.

These and other objects of the invention not specifically set forth above will become readily apparent from the accompanying description and drawing which diagrammatically illustrates the computer of the present invention.

A source of air at supply pressure $P_s$ can be obtained for the instrument of the present invention by ambient air probe 10 carried by a jet engine (not shown). At high speeds, the air captured by probe 10 has too high a temperature for the air to be utilized in air flow measurements involving air flow past valves and through orifices, both of which are subject to destruction at the high air temperatures. A passage 11 connects the probe with a heat exchanger 12 containing a plurality of cooling coils (not shown) receiving a cooling medium from passage 13 and discharging same through passage 14. The cold air at working fluid pressure $P_s$ leaves the heat exchanger through header 15 which has branches 16, 17, 18 and 19 leading to the various components of the computer.

The branch 17 connects the pressure $P_s$ with chamber 20 of a pressure-to-position transducer 21 through an inlet orifice 22 having an area $A_{22}$. The chamber 20 is divided into spaces 23 and 24 by a diaphragm 25 and the space 23, connected to branch 17, exhausts to pressure $P_{ex}$ through passage 26 containing outlet orifice 27 having an area $A_{27}$. A passage 28 connects a first ratio pressure, such as free stream static pressure $P_o$ obtained from a free stream Pitot tube, with the space 24 where it is balanced against the pressures $P_A$ in space 23 between the orifices 22 and 27.

The diaphragm 25 is connected with a valve stem 29 which extends through orifice 27 and out through the side of passage 26. A needle valve 30 is secured to stem 29 and located at orifice 27 to vary the throat area thereof until equilibrium is reached between pressures $P_o$ and $P_A$. The two orifices 22 and 27 and the space 23 form a pressure divider, such as described in U.S. Patent Re. 24,410 issued December 31, 1957, to John A. Drake. Due to the pressure divider geometry $$P_A = \frac{A_{22}}{A_{27}} P_s$$

and for steady state operation $$P_o = \frac{A_{22}}{A_{27}} P_s = P_A$$

and $$A_{27} = \frac{P_s}{P_o} A_{22}$$

The branch 19 connects pressure $P_S$ with a chamber 32 of a pressure-to-position transducer 33 through an inlet orifice 34 having an area $A_{34}$. The chamber 33 is divided into spaces 35 and 36 by a diaphragm 37 and the space 35 exhaust to pressure $P_{ex}$ through passage 38 containing outlet orifice 39 having an area $A_{39}$. A passage 40 conects a second pressure of the ratio, such as free stream total pressure $P_{T_o}'$ obtained from a free stream Pitot tube, with the space 36 where it is balanced against the pressure $P_B$ in space 35 between the orifices 34 and 39.

The diaphragm 37 is connected with a valve stem 41 which extends through orifice 39 and out through the side of passage 38. A needle valve 42 is secured to stem 41 and is located at orifice 39 to vary the throat area thereof until equilibrium is reached between pressures $P_B$ and $P_{T_0}'$. The two orifices 34 and 39 and space 35 form a second pressure divider in which $$P_B = \frac{A_{34}}{A_{39}} P_S$$

and for steady state operation where $P_B = P_{T_0}'$ $$A_{39} = \frac{P_S}{P_{T_0}'} A_{34}$$

The branch conduit 18 connects pressure $P_S$ with a third pressure divider 45 which comprises a passage 46 containing an inlet orifice 47 of throat area $A_{47}$ and an outlet orifice 48 of throat area $A_{48}$. The orifice 48 exhausts to pressure $P_{ex}$ and the space 49 between the orifices containing control pressure $P_c$ is connected by passage 50 with space 51 in chamber 52 also at pressure $P_c$. A needle valve 53 is positioned by stem 29 within the inlet orifice 47 and a needle valve 54 is positioned by stem 41 within the outlet orifice 48. The control pressure $P_c$ in spaces 49 and 51 is as follows:

$$P_c = P_S \frac{A_{47}}{A_{48}}$$

Also, the orifices are so dimensioned that $$A_{47} = k_1 A_{27}$$

for all positions $X_A$ of the stem 29, and $$A_{48} = k_2 A_{39}$$

for all positions $X_B$ of the stem 41.

Thus, it can be shown from the above that $$P_c = P_S \frac{k_1 \frac{P_S}{P_o} A_{22}}{k_2 \frac{P_S}{P_{T_0}'} A_{34}}$$

or $P_c = P_S$ $$\frac{P_{T_0}'}{P_o} \frac{k_1}{k_2} \frac{A_{22}}{A_{34}}$$

The space 51 in chamber 52 is isolated from space 55 containing pressure $P_D$ by a diaphragm 56 to which is attached a valve stem 57. The branch 16 containing pressure $P_S$ communicates with space 55 through an inlet orifice 58 having an area $A_{58}$, and the space 55 discharges to pressure $P_{ex}$ through passage 59 containing an outlet orifice 60 of area $A_{60}$. Valve stem 57 positions a needle valve 61 in orifice 60 and the stem extends out of conduit 59 to a transducer 62 and to an indicator $X_D$. In the steady state, the pressure $P_D$ equals the pressure $P_c$.

$$P_D = \frac{A_{58}}{A_{60}} P_S = P_c$$

or dividing out $P_S$ from the last two equations $$\frac{A_{58}}{A_{60}} = \frac{P_{T_0}'}{P_o} \frac{k_1 A_{22}}{k_2 A_{34}}$$

Since $$\frac{P_{T_0}'}{P_o}$$

is a function of Mach number, $$\frac{k_1 A_{22}}{k_2 A_{34}}$$

is a constant (the areas being constant), and $$\frac{A_{58}}{A_{60}}$$

is a function of position $X_D$ of stem 57 (area $A_{56}$ being constant); it follows that $$X_D = f(M)$$

where M is Mach number. Obviously, the transducer 62 can produce a voltage or other physical signal proportional to $X_D$ and therefore to Mach number.

The present invention is insensitive to changes in working fluid pressure or temperature. While the line supplying the working fluid at pressure $P_S$ can contain a cooling unit 12, such a unit is unnecessary if a source of working fluid is available at a temperature which can be withstood by the various orifices and valves subject to the flowing medium. Further, the static lines 28 and 40 supplying the pressures $P_o$ and $P_{T_0}'$ may be cooled any desired amount by heat exchangers 63 and 64 without changing the static pressures in the spaces 24 and 36, respectively, from the Pitot pressure. In other words, the static pressures in the static lines remain constant regardless of fluid temperature changes in the lines. Since, in the present device, the fluids at the static pressures do not flow, the temperature of the fluid at these pressures can be very high before requiring cooling in the static pressure lines.

Because the pressure $P_S$ of the working fluid is the same in all the pressure dividers, the shifts associated with altitude effects due to Reynolds number changes are cancelled out. The exhaust pressure can be any suitable low pressure sink and the pressure difference between the supply pressure $P_S$ and the exhaust pressure $P_{ex}$ is generally sufficient to choke the orifices of all the pressure dividers so that sonic flow exists at the orifice throats. Since the invention produces an output proportional to a pressure ratio, it can equally well be utilized to compute pressure recovery, thrust or specific fuel flow in an engine by changing the parameters monitored by the static pressure probes. While the invention has been described in connection with a pressure ratio computer, it is apparent that the pressure-to-position transducers 21 and 33 utilize the invention since static pressure rather than the pressure of a flowing fluid is utilized in one chamber and the flowing fluid in the other chamber may be cooled. Various other modifications are contemplated by those skilled in the art without departing from the spirit and scope of the invention as hereinafter defined by the appended claims.

What is claimed is:

1. A pressure ratio computer comprising first means for producing a movement proportional to a first static pressure of said ratio, second means for producing a movement proportional to a second static pressure of said ratio, third means responsive to both said movements for deriving from a working fluid pressure a control pressure $P_c$ proportional to the pressure ratio and to the working fluid pressure, and fourth means responsive to said working fluid pressure and to said control pressure for producing an output movement proportional solely to said pressure ratio.

2. A pressure ratio computer as defined in claim 1 wherein said first means comprises a diaphragm having movement proportional to said first pressure, said diaphragm receiving said first static pressure on one side, a pressure divider having two orifices in series connected with said working fluid pressure, the pressure intermediate the orifices of said pressure divider being connected with the other side of said diaphragm, the area of one of said orifices being controlled by the movement of said diaphragm.

3. A pressure ratio computer as defined in claim 1 wherein said second means comprises a diaphragm having movement proportional to said second pressure, said diaphragm receiving said second static pressure on one side, a pressure divider having two orifices in series connected with said working fluid pressure, the pressure intermediate the orifices of said pressure divider being connected with the other side of said diaphragm, the area of one of said orifices being controlled by the movement of said diaphragm.

4. A pressure ratio computer as defined in claim 1 wherein said third means comprises a pressure divider having a pair of spaced orifices connected with said working fluid pressure, a first needle valve connected with said first means for varying the area of one orifice, and a second needle valve connected with said second means for varying the area of the other orifice, said control pressure existing in the space between said orifices.

5. A pressure ratio computer as defined in claim 1 wherein said fourth means comprises a diaphragm receiving said control pressure on one side thereof, a pressure divider having a pair of spaced orifices connected with said working fluid pressure, and means connected with said diaphragm for varying the area of one of said orifices, the movement of said varying means providing the output movement proportional to said pressure ratio.

6. A pressure ratio computer comprising first diaphragm means in a first static chamber and receiving a first static pressure of said ratio on one side thereof, means responsive to the movement of said first diaphragm means for producing a balancing pressure on said first diaphragm means opposing said first pressure, second diaphragm means in a second static chamber and recovering a second static pressure of said ratio on one side thereof, means responsive to the movement of said second diaphragm means for producing a balancing pressure on said second diaphragm means opposing said second pressure, a pressure divider having the area of one orifice controlled by said first diaphragm means and the area of the other orifice controlled by said second diaphragm means to produce a control pressure $P_c$ between the orifices proportional to the pressure ratio and to the supply pressure $P_{sx}$ for the pressure divider, third diaphragm means receiving said control pressure on one side thereof, a second pressure divider receiving said supply pressure and responsive to movement of said third diaphragm means for producing a balancing pressure on said third diaphragm means opposing said control pressure, and means positioned by said third diaphragm means for providing a measure of said pressure ratio.

7. A pressure ratio computer as defined in claim 6 wherein each of said balancing pressure producing means comprises a pressure divider connected with said supply pressure and having an orifice variable in area by one of said diaphragm means.

8. A pressure ratio computer as defined in claim 7 wherein said supply pressure is derived from a source of high temperature gas, and means for cooling said gas before entering all said pressure dividers in order to prevent damage to said pressure dividers by the flowing high temperature gas.

9. A pressure ratio computer as defined in claim 6 wherein said first static pressure is derived from a static supply line receiving high temperature gas, and means for cooling the gas in said supply line without changing the static pressure in said first chamber.

10. A pressure ratio computer as defined in claim 6 wherein said second static pressure is derived from a static supply line receiving high temperature gas, and means for cooling the gas in said supply line without changing static pressure in said second chamber.

11. A pressure ratio computer comprising a first static chamber receiving a first pressure of the ratio, a second static chamber receiving a second pressure of the ratio, a source of working fluid supplied to first and second pressure dividers, each comprising first and second spaced orifices, a first diaphragm separating the space between the orifices of the first pressure divider from said first pressure, a second diaphragm dividing the space between the orifices of said second pressure divider from the space containing said second pressure, a valve stem connected to said first diaphragm and carrying a needle valve for controlling the throat area of one of the orifices of said first pressure divider to produce a pressure between the first divider orifices equal to the first pressure, a second valve stem connected to said second diaphragm and carrying a needle valve for controlling the throat area of one of the orifices of said second pressure divider to produce a pressure between the second divider orifices equal to the second pressure, a third pressure divider receiving said working fluid and comprising spaced orifices, a needle valve carried by said first stem for controlling one of said third divider orifices and a needle valve carried by said second stem for controlling the other of said third divider orifices, the space between the orifices of said third pressure divider being connected with one side of a third diaphragm, a fourth pressure divider receiving said working medium and having spaced orifices, and a third stem connected to said third diaphragm for controlling the area of one of the orifices of said fourth pressure divider to balance the pressures on said third diaphragm, the position of said fourth stem being an indication of said pressure ratio.

References Cited in the file of this patent

UNITED STATES PATENTS

| | | |
|---|---|---|
| 2,981,058 | Reed | Apr. 25, 1961 |
| 2,986,929 | Reed | June 6, 1961 |

FOREIGN PATENTS

| | | |
|---|---|---|
| 59,596 | Netherlands | June 17, 1947 |